July 6, 1954 E. J. LOMAZZO ET AL 2,682,924
EXPANSIBLE AND COLLAPSIBLE MANDREL
Original Filed March 1, 1949 2 Sheets-Sheet 2

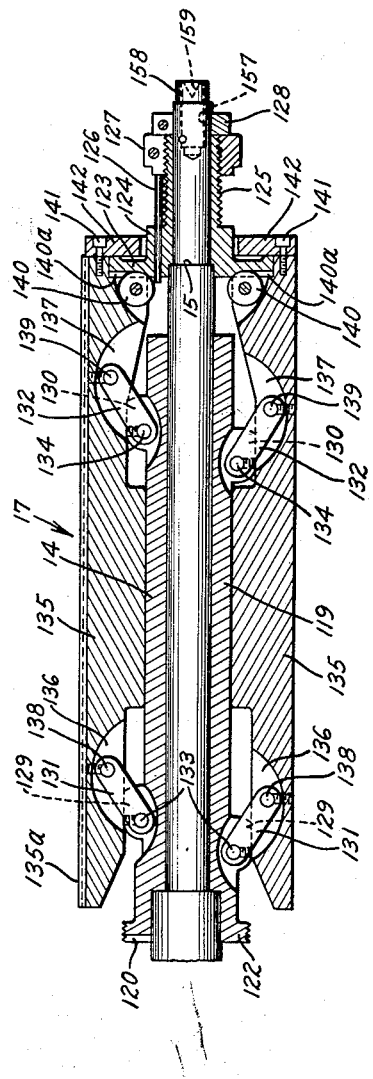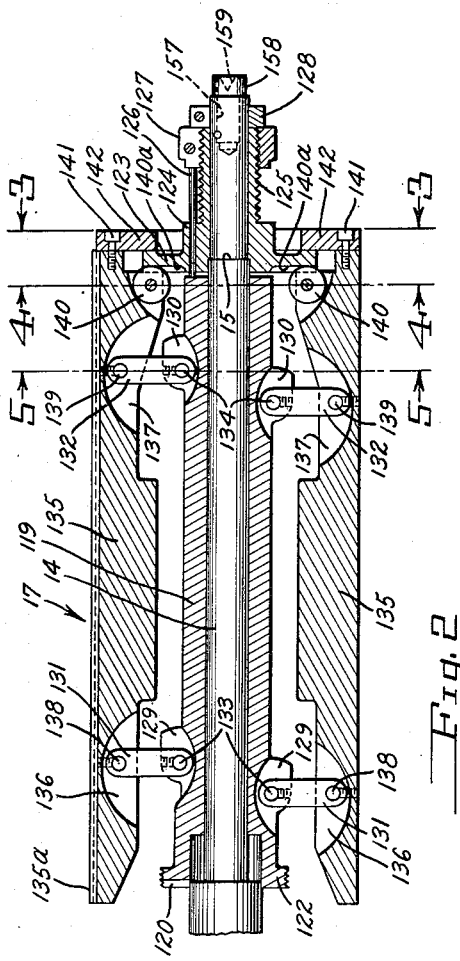

INVENTORS.
EDMUND J. LOMAZZO
LLOYD E. MAQUAT
BY
ATTORNEY

UNITED STATES PATENT OFFICE 2,682,924

EXPANSIBLE AND COLLAPSIBLE MANDREL

Edmund J. Lomazzo, Norwalk, and Lloyd E. Maquat, Easton, Conn., assignors, by mesne assignments, to Lico Manufacturing Co., Inc., Bridgeport, Conn., a corporation of Connecticut Original application March 1, 1949, Serial No. 79,047. Divided and this application January 16, 1951, Serial No. 206,158

3 Claims. (Cl. 164—69)

This invention relates to new and useful improvements in mandrels and has particular relation to a mandrel especially adapted for use in gasket, belt or the like cutting machines.

An object of the invention is to provide an improved construction of expansible and collapsible mandrel which while especially advantageous in belt and gasket cutting machines is also of general application.

Other objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention and the scope of the appended claims.

In the drawings:

Fig. 1 is a longitudinal sectional view through the mandrel of the invention, the mandrel being collapsed;

Fig. 2 is a similar view but with the mandrel expanded;

Fig. 3 is an end elevational view looking from the outer end of the mandrel with the latter expanded, the view being taken as along the line 3—3 of Fig. 2 but on a slightly larger scale;

Fig. 4 is a transverse sectional view taken as along the line 4—4 of Fig. 2, but on the scale of Fig. 3; and Fig. 5 is a similar view taken as along the line 5—5 of Fig. 2 and on the scale of Fig. 3.

This application is a division of our application Serial Number 79,047 filed March 1, 1949 for Gasket Cutter.

Referring in detail to the drawings, at 14 is shown a mandrel mounting spindle to be rotated as, for example, disclosed in our parent application above identified. This spindle has a shoulder 15 toward its outer end. When the mandrel is in use on a machine, the outer end of this spindle will be supported and centered on a tailstock center and the spindle supports an expansible and collapsible mandrel generally designated 17.

Such mandrel is adapted to receive and support a piece of work in the form of a relatively heavy cylinder generally of rubber or of a laminated construction of rubber and cotton or the like. In any event, the material which is supported by the mandrel will be cylindrical and will include rubber or rubber-like material and is adapted to be cut into rings, gaskets, belts, etc. depending upon the size of the cylinder and the end product desired. As the present application is directed to our mandrel structure per se, the machine for mounting the same and the means for cutting stock on the mandrel are not herein disclosed, although such means are disclosed in our above identified application.

Toward its inner end the spindle 14 includes a substantially cylindrical portion 116. The mandrel 17 is mounted on the spindle 14 and it is here noted that this mandrel includes an inner sleeve 119 mounted on the spindle 14 to turn therewith and also for limited movement longitudinally thereof. At its inner end, this sleeve 119 includes an enlargement or hollow socket-like portion 118 adapted to slidingly or telescopically receive the enlarged portion 116 of the spindle.

Additionally, at its inner ends this sleeve is provided with key receiving recesses or sockets 120 whereby said sleeve may be coupled in driving relation with a suitable driving means (not shown). At the same time, such inner end of the sleeve may be externally screw threaded as at 121, this comprising part of a means (not shown) whereby the sleeve may be further coupled with a driving means. As shown in the present drawings, the sleeve 119 is disconnected from any driving means and thus there is nothing to prevent movement of the mandrel along the spindle 14 outwardly from the enlarged inner diameter portion 118 of the latter.

In addition to the sleeve 119, the mandrel 17 includes an annular plate or disc 123 having a hub portion at 124 and integral with such hub portion there is an outwardly extending reduced diameter externally threaded sleeve 125. One or more elongated pins 126 pass through the hub portion 124 and may slide back and forth in this hub portion. Threaded on the sleeve 125 is a stop device in the form of a collar 127 and such collar is adapted to be adjusted along the sleeve and to limit the extent to which the pin or pins 126 may be pushed outwardly through the hub portion 124.

A nut 128 is clamped on the outer end portion of the spindle 14 in a position against the outer end of the externally threaded sleeve 125 whereby such sleeve and the entire mandrel 17 are held against movement outwardly longitudinally of the spindle 14. Inward movement of disc 123 along the spindle is prevented by engagement of an internal shoulder of the disc hub with the external shoulder 15 on the spindle 14.

At suitably spaced points, the sleeve 119 is provided with inner and outer sets of lugs 129 and 130. The number of lugs employed will depend on the number of segments in the mandrel. The lugs of each set are arranged radially about the sleeve 119 and each lug of the inner set is, measured along the length of the sleeve, aligned with or in the same plane with its corresponding lug in the outer set.

Measured transversely of the sleeve, the alternate lugs of the inner set and the alternate lugs of the outer set are slightly offset with respect to one another so that transversely the alternate lugs of the outer set of lugs are in slightly different planes and the same is true of the lugs of the inner set. It is noted that such an arrangement permits of our making an expansible and collapsible mandrel having an exceptionally large number of segments.

Sets of inner and outer links 131 and 132, all of the same length, are employed and each link 131 at its inner end is secured by means of a pin 133 with a pair of the lugs 129 while each link 132 at its inner end is secured as by a pin 134 with a pair of lugs 130. These pins pivotally attach the inner ends of the links 131 and 132 to the sleeve 119. A series of bars or segments 135 are provided, each having a transversely arcuate outer surface, all bars or segments having their outer surface on an identical arc.

Each bar or segment is also provided with inner and outer sets of lugs 136 and 137 and pins 138 secure the outer ends of links 131 with the lugs 136 while similar pins 139 secure the outer ends of links 132 with lugs 137. With the described construction, it will be seen that the links 131 and 132, the bars or segments 135 are connected with the sleeve 119 but there may be relative movement between the segments or bars and the sleeve as the links 131 and 132 swing on their pivots or on their pivotal connections with the sleeve and the segments or bars. Toward its outer end, each bar or segment 135 carries a roller 140 and these rollers are adapted to travel in radially extending guide slots 140a in the inner face of the disc 123.

Screws 141 attach to the outer end of each bar or segment 135 a lug 142 and these lugs are radially arranged and each extends radially inwardly and overlaps the outer face or side of the disc 123. Since rollers 140 bear against the inner surface of the slots 140a of the disc 123 and the lugs 142 bear against the outer surface of said disc, and these parts are rigid with respect to segments or bars 135, it will be understood that such segments or bars are secured against movements in the directions of their lengths by the disc 123 but may move radially outwardly and inwardly relative to said disc. Thus, the mandrel 17 may be expanded from the collapsed condition of Fig. 1 to the expanded condition of Fig. 2 and from such expanded to such collapsed condition.

Assuming the mandrel to be collapsed as in Fig. 1, a piece of work comprising a cylinder of rubber or of a laminated structure which may include rubber, canvas or the like, is slipped onto the mandrel over its outer end, i. e., its end toward the nut 128. Then, through suitable means (not shown but which may comprise the power means of our above described application) the sleeve 119 is shifted outwardly as from the position of Fig. 1 to or toward the position of Fig. 2. As the sleeve 119 is shifted outwardly along the spindle 14, the sets of links 131 and 132 have a thrust applied to them, which thrust they transmit to the segments or bars 135.

Because of the engagement of the rollers 140 with the inner surface of the plate or disc 123, the segments or bars cannot move in the directions of their lengths and so the thrust applied to them through the links results in their moving outwardly radially with respect to the sleeve 119 or in a direction to increase the effective diameter of the mandrel. As the forward end of the sleeve 119 strikes the inner ends of the pins 126, these pins move outwardly until they engage the stop 127. At this time, the mandrel is expanded to the desired extent. In this connection, it will be apparent that the stop 127 is adjustable along the threads of the portion 125, inwardly and outwardly in the direction of the length of the mandrel and in use, this stop is adjusted or positioned depending upon the work to be handled and the desired or necessary extent of expansion of the mandrel.

After work on the mandrel has been cut into segments, or otherwise completed, it is then desirable to collapse the mandrel whereby to reduce its effective diameter to permit of the work being more readily removed from the mandrel. In this connection, it will be understood that after a piece of work has been placed on the mandrel, the latter is expanded to forcefully engage with the work and to expand the work slightly or at least to place a tension on it. Generally, there is a cushioning cylinder of rubber or the like about the mandrel and under the work whereby when the work is cut with a knife, the latter is not brought against the metal mandrel on passing through the work. For the purpose of mounting any such cushioning cylinder in the same relation to the segments of the mandrel on re-expansion of the latter following its collapse from a once expanded position with the cushioning sleeve thereon, one of the segments 135 is shown as provided with a longitudinally extending key 135a.

To collapse the mandrel to permit of easier removal of the completed work therefrom, the sleeve 119 of the mandrel is drawn inwardly moving the inner ends of the sets of links 131 and 132 toward the left from the position shown in Fig. 2 toward the positions in which the links are shown in Fig. 1. This inward shifting of the sleeve 119 may be accomplished in the desired manner as, for example, that particularly disclosed in our parent application above identified.

Such shifting of the sleeve 119 results in a pull being transmitted through the links to the segments or bars 135, but owing to the fact that the lugs 142 are rigid with the forward ends of these bars and that such lugs overlap the outer end or side of the plate 123, the bars can have no longitudinal movement. Therefore, the mentioned pull or draw transmitted through the links 131 and 132 resolves itself into a movement drawing the segments or bars 135 inwardly toward the sleeve 119 reducing the effective diameter of the mandrel.

At this time, the work or product is removed from the mandrel and a new piece of work mounted on the mandrel and then the latter expanded as first described above. In this connection it will be understood that so long as the work is of the same size, the stop 127 is left in position and during the expanding of the mandrel, the operator does not have to keep measuring the mandrel or the work to see if the proper expansion of the mandrel has been obtained. When the sleeve 119 pushes the pins 126 hard against the stop 127, the mandrel is expanded to the desired extent and cannot be further expanded save on adjustment of the stop. The mandrel may be removed from the spindle 14 to permit of its replacement by a larger or smaller mandrel simply on removal of the nut 128.

As above suggested, the outer end of the spindle 14 is to be centered and supported on a tailstock center (not shown). To prevent wear in the spindle 14, the latter is constructed so as not to bear directly on a tailstock center. Thus, spindle 14 is bored in its outer end to receive the stem 157 of a bearing head 158 having a tapered socket 159 in its outer end to receive the cone point of a tailstock center. Should the socket 159 wear, then the head 158 is replaced by withdrawing its stem from the outer end of the spindle 14 and then mounting a new head on the outer end of the spindle.

Having thus set forth the nature of our invention, what we claim is:

1. In an expansible and collapsible mandrel, a spindle, a sleeve supported on said spindle for longitudinal movement thereon, a plurality of longitudinally extending segments, a pair of longitudinally aligned radially extending links mounting each said segment upon said sleeve, said links being parallel to each other and pivotally connected at their outer ends to said segment and at their inner ends to said sleeve, a plate fixed to said spindle beyond the outer end of said sleeve and having a longitudinal passage, connection means between the outer ends of said segments and said plate restraining relative longitudinal movement and permitting relative radial movement of said segments, a pin slidable in said passage having its inner end projected inwardly from said plate and longitudinally aligned with the outer end of said sleeve, an extension on the outer side of said plate, and a longitudinally adjustable stop member on said extension in the path of outward movement of said pin.

2. In an expansible and collapsible mandrel, a spindle, a sleeve supported on said spindle for longitudinal movement thereon, a plurality of longitudinally extending segments, a pair of longitudinally aligned radially extending links mounting each said segment upon said sleeve, said links being parallel to each other and pivotally connected at their outer ends to said segment and at their inner ends to said sleeve, a plate fixed to said spindle beyond the outer end of said sleeve, and connection means between the outer ends of said segments and said plate restraining relative longitudinal movement and permitting relative radial movement of said segments, said connection means including a radially disposed roller carried by each of said segments having rolling engagement with the inner side of said plate.

3. In an expansible and collapsible mandrel, a spindle, a sleeve supported on said spindle for longitudinal movement thereon, a plurality of longitudinally extending segments, a pair of longitudinally aligned radially extending links mounting each said segment upon said sleeve, said links being parallel to each other and pivotally connected at their outer ends to said segments and at their inner ends to said sleeve, a plate fixed to said spindle beyond the outer end of said sleeve and having a plurality of radial channels in its inner side, one for each segment, and connection means between the outer ends of said segments and said plate restraining relative longitudinal movement and permitting relative radial movement of said segments, said connection means including a radially disposed roller carried by each of said segments, said rollers having rolling engagement in said respective channels.

References Cited in the file of this patent

UNITED STATES PATENTS

| Number | Name | Date |
| --- | --- | --- |
| 390,719 | Taylor et al. | Oct. 9, 1888 |
| 567,658 | Rose | Sept. 15, 1896 |
| 967,175 | Demorchi | Aug. 16, 1910 |
| 1,448,528 | Elliott | Mar. 13, 1923 |
| 1,823,959 | Steinmayer | Sept. 22, 1931 |
| 2,202,883 | Yoder | June 4, 1940 |